Sept. 8, 1942. J. C. SHARP Re. 22,177

HEATING DEVICE

Original Filed Dec. 27, 1939

Inventor:
John C. Sharp,
by Harry E. Dunham
His Attorney.

Reissued Sept. 8, 1942

Re. 22,177

UNITED STATES PATENT OFFICE 22,177

HEATING DEVICE

John C. Sharp, Glen Ellyn, Ill., assignor to Edison General Electric Appliance Company, Inc., Chicago, Ill., a corporation of New York Original No. 2,274,348, dated February 24, 1942, Serial No. 311,147, December 27, 1939. Application for reissue May 9, 1942, Serial No. 442,395

8 Claims. (Cl. 219—37)

This invention relates to heating devices, more particularly to heating devices provided with hot plates, such as a range, and it has for its object the provision of an improved device of this character having a hot plate that increases the speed and efficiency of cooking, one which has a simple, durable and inexpensive construction, and moreover which is constructed and arranged to greatly facilitate the cleaning of the various elements of which the plate is made.

In one form of this invention, the range is provided with a top wall defining a cooking surface or area that has an opening for receiving a heating unit. The heating unit has a heat generating element, and a support for the heat generating element that holds it in its cooking position in the opening in the cooking surface. In one form, a sheathed electric heating element is provided, and is supported on a grid-like frame which in turn is mounted in a ring that is supported by the top wall of the range.

Under the heat generating element is a reflector formed from a single piece of reflecting material. The reflector is separable as a unit from the heating element and its supporting member. The top wall supports the reflector beneath the heat generating element so that when the heating element and its support are removed or elevated from their opening in the top wall, the reflector may be withdrawn as a unit for the purpose of cleaning, repair or replacement. In order to facilitate the removal of the reflector, the heating means comprising the heat generating element and its supporting ring are pivotally secured to the top wall of the range so that the heating element and its support can be swung upwardly as a unit from the opening to provide ready access to the reflector which is supported beneath it.

Preferably, the heating element will be provided with terminals arranged at the side and adjacent the pivotal connection means between the heating unit and the top wall, and preferably these terminals will extend downwardly through the supporting ring, and also through the reflector which is provided with a recess through which the terminals extend. The down-turned terminal ends are provided with suitable means for protecting them from contact with spillage.

Figure 1:
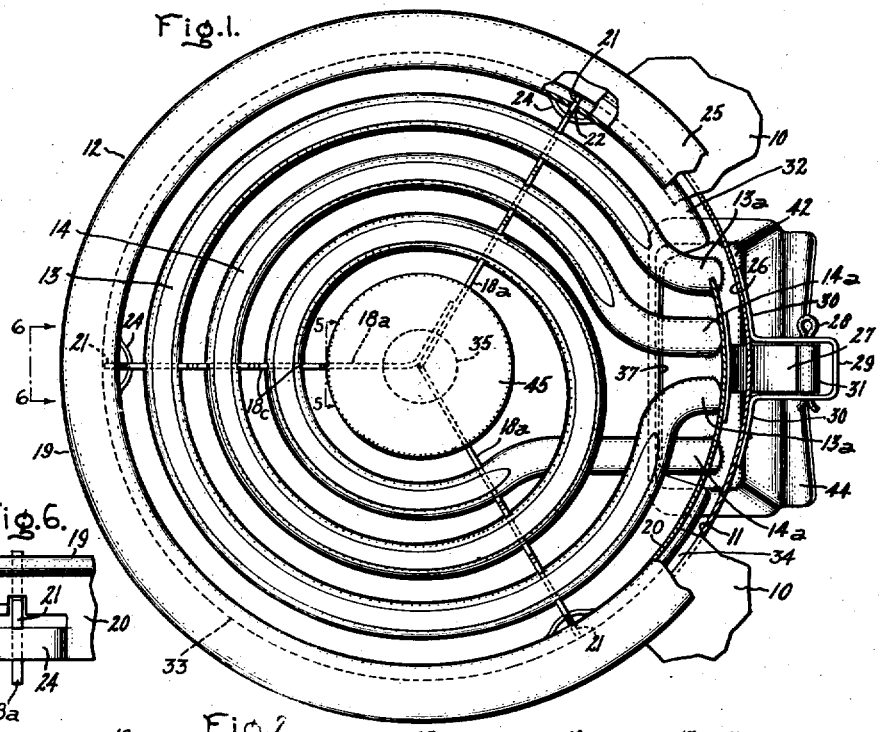
Figure 6:
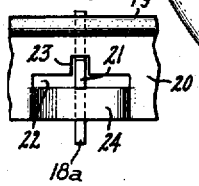
Figure 2:
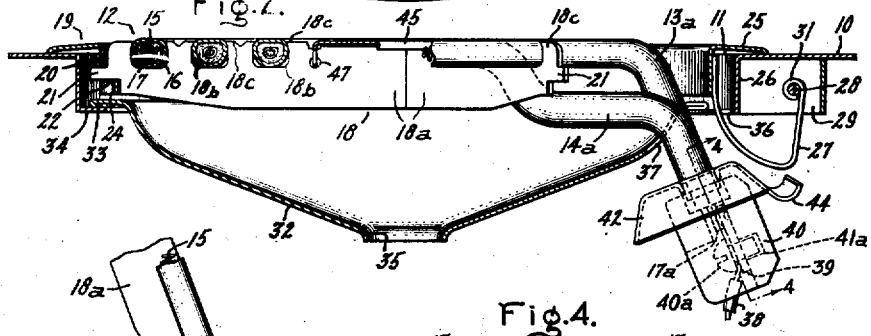
Figure 3:
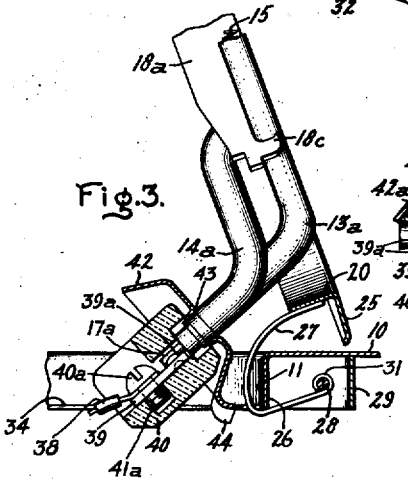
Figure 4:
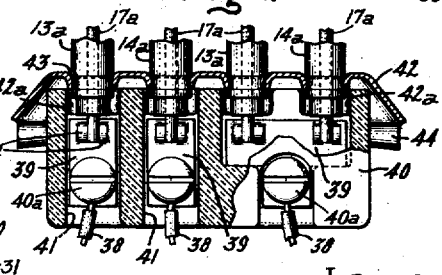
Figure 5:
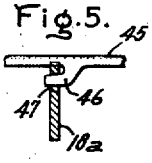

For a more complete understanding of this invention, reference should be had to the accompanying drawing in which Fig. 1 is a plan view of an electric heating device embodying this invention, parts being shown in section and parts broken away so as to illustrate certain details of construction; Fig. 2 is a vertical sectional view taken through the heating unit of Fig. 1; Fig. 3 is a fragmentary view similar to Fig. 2, but illustrating certain elements in different positions; Fig. 4 is a sectional view taken through the line 4—4 of Fig. 2 and looking in the direction of the arrows; Fig. 5 is an enlarged sectional view taken through the line 5—5 of Fig. 1 and looking in the direction of the arrows; and Fig. 6 is a fragmentary elevation looking in the direction of the arrows 6—6 of Fig. 11.

Referring to the drawing, this invention has been shown in one form as applied to an electric range provided with a heating unit having an electric sheathed heat generating element. As shown, the range comprises a top wall or heating surface 10 which is provided with a circular opening 11 that is adapted to receive the heating unit 12.

The heating unit 12 comprises a pair of sheathed heating elements 13 and 14 lying in a common plane that is substantially parallel to the top wall of the range. Preferably, these elements will be constructed as described in the United States patent to C. C. Abbott No. 1,367,341, dated February 1, 1921; as there described, each heating element is provided with a coiled resistance conductor 15 housed in a metallic sheath 16 and supported in spaced relation with reference to the sheath by a highly compacted layer 17 formed of a suitable heat conducting, electrically insulating material, such as powdered magnesium oxide. The heating element 13 is in the shape of a distorted U positioned around the heating element 14, as shown. The terminal sections or ends 13*a* of the heating element 13 are located at one side of the heating unit 12, as shown. The inner heating element 14 is in the form of a spiral, and also has its terminal sections or ends 14*a* at one side of the unit 12 and adjacent the terminal sections 13*a* of the element 13. Both of the terminal sections 13*a* and 14*a* extend downwardly and outwardly from the plane of the elements 13 and 14, as shown in Fig. 2. The terminal sections 13*a* and 14*a* of the two elements are provided with terminals 17*a* which have their inner ends electrically connected with the resistance conductors 15 and their outer ends projecting from their associated sheaths, as clearly shown in Fig. 4.

The two heating elements 13 and 14 are mounted on a grid 18 which, as shown, comprises three arms 18*a* joined at the center of the unit 12 and extending radially outwardly at angles of 120° to each other. These arms are provided with notches 18b in which the turns of the heating elements 13 and 14 are received and which are provided with peened-over sections 18c that firmly grip the turns and hold them in their proper relation to each other. The outer ends of the arms 18a are mounted in a supporting member 19 which as shown is provided with a vertically positioned circular flange 20. The grid arms 18a are provided with outwardly projecting tongues 21 at their ends which are received in apertures 22, 23 provided for them in this circular flange. The section 22 of each aperture is elongated, as shown, and the material of the flange under this section is bent inwardly to define an abutment 24 which supports the associated grid arm 18a, as clearly shown in Figs. 1, 2, and 6.

The flange 20 is adapted to be inserted in the opening 11 of the top wall 10 so as to support the heating elements 13 and 14 in proper cooking position in the top wall. For this purpose, the support 19 is provided with a substantially horizontal circular flange 25 extending outwardly from the upper edge of the circular flange 20 and adapted to overlap the area of the top wall 10 around the opening 11, as clearly shown in Figs. 1 and 2. It is to be understood that the heating elements 13 and 14 project upwardly above the adjacent upper edges of the grid arms 18a and also above the highest section of the flange 25 so that cooking vessels can be placed upon and in direct thermal contact with the sheaths 16 of these heating elements.

The top wall 10 is provided with a flange 26 depending downwardly in the opening 11 and in substantially concentric relation with the flange 20 of the support 19 when the heating unit is in its proper cooking position. The diameter of the opening 11 is somewhat larger than the diameter of the flange 20 so that the flange 26 is spaced somewhat from the flange 20, as clearly shown in Figs. 1 and 2. Mounted within the space between the flanges 20 and 26 is one leg of a distorted U-shaped hinge arm 27. This leg is rigidly secured to the flange 20 in any suitable manner, as by welding, and extends downwardly through the space between the flanges so that its nexus is below them, as shown in Fig. 2. The other leg of the hinge arm extends upwardly to a point opposite the outside surface of the flange 26 and this leg is pivotally connected to the top wall 10 by means of a hinge pin 28 which is mounted in a U-shaped bracket 29. As shown more clearly in Fig. 1, the U-shaped bracket 29 has flanges 30 extending laterally outwardly from its two legs; these flanges 30 are secured to the flange 26 and hence to the top wall 10 in any suitable manner, as by welding. The arm 27 is hinged to the pin 28 by means of an eyelet 31 which receives the pin, as clearly shown in the drawing.

Preferably and as shown, the hinge connection means between the heating unit and the top plate is adjacent the terminal sections 13a and 14a; in the form of the invention shown in the drawing the terminal sections are located directly opposite the hinge means.

Positioned under the heat generating elements 13 and 14 and under the grid 18 which supports them and also the support 19 which supports the grid is a reflector 32. The reflector is roughly parabolic in shape, and has at its marginal edge an outwardly extending flange 33 which is mounted upon a seat 34. The seat 34, as shown, extends inwardly laterally from the depending flange 26. At the center the reflector 32 is provided with a drain opening 35. The seat 34 is provided with a notched section 36 through which the hinge arm 27 passes; and the reflector is provided with a notched section 37 through which the downwardly extending terminal sections 13a and 14a of the two heating elements 13 and 14 extend.

Suitable electrical supply leads 38 are provided for the heating elements 13 and 14. These leads are electrically connected with the terminals 17a by connector members 39 which have extruded portions 39a between which the ends of the terminals 17a are placed and fastened in any suitable way, as by welding. The connector members 39 are positioned in a terminal block 40 formed of any suitable electrically insulating material, such as porcelain, and which is provided with recesses 41 that receive the connector members. As shown, the leads 38 are connected to the connector members 39 by lead screws 40a. The terminal block 40 is loosely secured to the heating elements by the lead screws 40a which project into recesses 41a provided for them in the block, as shown.

In the form of the invention shown, one set of the terminals 17a of the two heating elements 13 and 14 are electrically connected together by one of the connectors 39 which is connected with one supply lead 38, while the opposite terminals of the two elements are separate and are electrically connected to the other two of the supply leads. These connections are such that the heating elements 13 and 14 can be connected in various relations to a three-wire supply source (not shown) to obtain various heating effects.

The terminals 17a, the connectors 39, and leads 38 are protected by means of a suitable metallic terminal shield 42 which completely covers the top of the terminal block 40, as clearly shown in Fig. 2. Preferably, the ends of the elements 13 and 14 will extend into recesses 42a provided for them in the terminal block 40, and the casing 42 will be provided with spaced apertures 43 which receive these ends of the elements. The casing is flanged inwardly around these openings, as shown in Fig. 4, and the flanges are secured to the metallic sheaths 16, in any suitable manner, but preferably by crimping them onto the sheaths. It will be observed that the shield 42 is located so that it will intercept drippage that might fall down on the terminal section of the heating unit. A the outer side of the shield 42 under the hinge arm 27 is a channel 44 inclined downwardly from the center toward the two sides to carry drippage away from the terminals at this side of the shield.

The center of the unit may be partially closed by a circular plate 45 which is secured to the grid arms 18a by means of lugs or ears 46 formed at the edges of the plate and received in apertures 47 provided for them in the grid arms.

It will be observed that the heating device of this invention has a very simple construction. The heating elements are mounted in an open grid which in turn is supported in a ring, in a very simple and inexpensive manner. The turns of the heating element are spaced apart rather widely so that all parts of the heating element, grid and ring are accessible for cleaning. In addition, it will be observed that the reflector is accessible merely by swinging the heating unit 12 upwardly on its hinge connection. When this is done the reflector 32 may be withdrawn laterally. It is to be noted that if the heating element is swung upwardly far enough the terminal protecting casing 42 will engage the reflector to elevate it so that it is more easily accessible. The reflector itself is of a simple construction being formed of a single reflecting sheet formed roughly in the shape of a parabola. The parabolic shape given the reflector insures the reflection of substantially all of the heat rays that are projected downwardly from the heating units back upwardy to the cooking vessel placed on the hot plate. The provision of this reflector in combination with the sheathed heating elements which directly support the cooking vessel increases the speed and efficiency of the operation of the hot plate.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An electric range comprising a top wall formed with an opening therein for receiving a heating unit, means depending downwardly from said wall through said opening to define a laterally extending supporting seat, an electric heating element, a supporting member having a supporting portion around said element, means securing said element to said supporting portion, said supporting portion fitting into said opening, and the supporting member having a part overlapping the top wall around the opening to support the supporting portion and thereby the heating element in its cooking position in said opening, a hinge arm secured to said supporting member having a part extending under said top wall, means pivotally connecting said part to said top wall, and a reflector under said heating element separate from said heating element and said supporting member within which said heating element is mounted and resting on said seat so as to be removable therefrom when said supporting member is pivoted upwardly.

2. An electric range comprising a top wall having an opening therein for receiving a heating unit and a flange depending down from said wall through said opening terminating in a laterally extending seat, an electric heating element, a support having a supporting portion for said heating element fitted into said opening, means securing said heating element to said supporting portion, and said support having a part engaging a part of said top wall so as to support said supporting portion within said opening, a hinge arm secured to said support having a part extending under said top wall, means pivotally connecting said part to said top wall, and a reflector under said heating element separate as a unit therefrom and from said support within which said heating element is mounted and resting on said seat so as to be removable therefrom when said support is pivoted upwardly.

3. An electric range comprising a top wall having an opening therein for receiving a heating unit and a flange depending down from said wall through said opening terminating in a laterally extending seat, a sheathed electric heating element, a supporting member having a continuous supporting portion around said element, means securing said element to said supporting portion, said supporting portion fitting into said opening, and the supporting member having a part overlapping said top wall around the opening to support the supporting portion and thereby the heating element in its cooking position in said opening, a hinge arm secured to said supporting member having a part extending under said top wall, means pivotally connecting said part to said top wall, and a reflector under said heating element separate as a unit from said heating element and said supporting member within which the heating element is mounted and resting on said seat so as to be removable therefrom when said supporting member is pivoted upwardly.

4. A range comprising a top wall having an aperture therein for receiving a heating unit, and a flange depending downwardly in said aperture terminating in an inwardly extending transverse seat, a heat generating element, a support mounted on said top wall having a continuous supporting portion secured to said element, a reflector under said heat generating element resting on said seat, a hinge arm secured to said supporting portion close to said flange and extending downwardly and outwardly to a point under said top wall, the seat having a recess through which said arm passes, and hinge means secured to said top wall pivotally mounting said arm.

5. An electric range having a top wall provided with an opening therein for receiving a heating unit that has a supporting ring receivable in said opening, a sheathed electrical heating element within said ring having terminal ends adjacent each other and a section of said ring and directed downwardly through said ring, terminals for said ends secured thereto, a shield attached to said ends covering said terminals to protect them from drippage through said ring, a hinge connecting said ring to said top wall, a reflector detached from said ring and heating element located under said heating element and having a recess through which said terminal ends pass, and means supporting said deflector under said heating element.

6. An electric range comprising a top cooking wall provided with a circular aperture and a circular flange extending down through the aperture, a circular support having an outwardly extending flange overlapping said wall around said opening and a circular flange extending down through said opening in substantially concentric relation with said flange on said top wall, an electric sheathed heating element mounted in said circular support having terminal sections at one side adjacent said support and extending downwardly and outwardly, said flange on said top wall having an inwardly extending circular seat, a reflector for said heating element resting on said seat provided with a notch through which said terminal sections extend, a hinge arm secured to said circular support, and a hinge pin to which said arm is pivoted secured to said flange on said top wall.

7. An electric range, comprising a top wall formed with an opening therein for receiving a heating unit, means depending downwardly from said wall through said opening to define a laterally extending supporting seat, said heating unit having an electrical heating element and a supporting member therefor having a supporting portion around said element, means securing said element to said supporting portion, said supporting portion fitting into said opening, and the supporting member having a part overlapping the top wall around the opening to support the supporting portion and thereby the heating element in its cooking position in said opening, a hinge arm secured to a portion of said heating unit and having a part extending under said top wall, means pivotally connecting said part to said top wall, and a reflector under said heating element separate from said heating element and said supporting member within which said heating element is mounted and resting on said seat so as to be removable therefrom when said supporting member is pivoted upwardly.

8. An electric range comprising a top wall having an opening therein for receiving a heating unit and a flange depending down from said wall through said opening terminating in a laterally extending seat, said heating unit having an electric heating element, and a support therefor having a supporting portion for said heating element fitted into said opening, means securing said heating element to said supporting portion, and said support having a part engaging a part of said top wall so as to support said supporting portion within said opening, a hinge arm secured to said heating unit having a part extending under said top wall, means pivotally connecting said part to said top wall, and a reflector under said heating element separate as a unit therefrom and from said support within which said heating element is mounted and resting on said seat so as to be removable therefrom when said support is pivoted upwardly.

JOHN C. SHARP.